United States Patent [19]
Gombos et al.

[11] Patent Number: 6,016,731
[45] Date of Patent: Jan. 25, 2000

[54] RECOMPACTED HAY BALE CUTTING AND STACKING SYSTEM

[75] Inventors: John M. Gombos; Bret A. Simpson; Adam C. Bird, all of Ellensburg, Wash.

[73] Assignee: Nicholson Manufacturing Company, Inc., Seattle, Wash.

[21] Appl. No.: 09/226,334

[22] Filed: Jan. 6, 1999

Related U.S. Application Data

[63] Continuation of application No. 08/499,702, Jul. 7, 1995, Pat. No. 5,887,504.

[51] Int. Cl.$^7$ ........................................................ B26D 1/03
[52] U.S. Cl. .............................. 83/425.2; 83/431; 83/527; 83/858
[58] Field of Search ................................. 83/425.2, 431, 83/527, 858, 808, 528, 856, 132, 439; 193/3, 17

[56] References Cited

U.S. PATENT DOCUMENTS

| | | | |
|---|---|---|---|
| 3,612,127 | 10/1971 | Benno | 83/808 |
| 3,618,649 | 11/1971 | Benno | 83/788 |
| 4,250,783 | 2/1981 | Ogle | 83/397 |
| 4,909,139 | 3/1990 | Montano et al. | 83/404 |
| 4,996,899 | 3/1991 | Henderson | 83/23 |
| 5,001,974 | 3/1991 | Gombos . | |
| 5,017,399 | 5/1991 | Montano et al. | 83/929 |
| 5,099,755 | 3/1992 | Montano et al. | 83/425.3 |
| 5,343,670 | 9/1994 | Gombos et al. . | |
| 5,367,932 | 11/1994 | Bergman | 83/425.2 |
| 5,392,591 | 2/1995 | Simpson . | |
| 5,893,309 | 4/1999 | Ast | 83/404.2 |

*Primary Examiner*—M. Rachuba
*Attorney, Agent, or Firm*—Christensen O'Connor Johnson & Kindness PLLC

[57] ABSTRACT

A compressed hay bale cutting and stacking system includes a compressed bale cutter and a stacker arranged to stack half-cut or quarter-cut bales in multi-tier stacks while maintaining slices of the bales in substantial alignment. The bale cutter is oriented to discharge the half-cut or quarter-cut bales as a unit at a predetermined elevation. The stacker has a table assembly and a pushoff assembly positioned to receive each bale as a unit from the bale cutter and automatically form a stack of at least 2 bale by 2 bale tiers. The table assembly has an elongate first platform movable vertically on the stacker frame between a raised position aligned with the bale cutter discharge to form a first row of bales and a lowered position for receiving a second row of bales, to accumulate a tier of stacked bales while maintaining the bales substantially aligned along their vertical sides. The pushoff assembly is mounted on the frame with a vertical pushoff plate adjacent the table assembly and is extendable across the platform when in the lowered position to sweep each tier of stacked bales off the platform to add it to a stack.

7 Claims, 12 Drawing Sheets

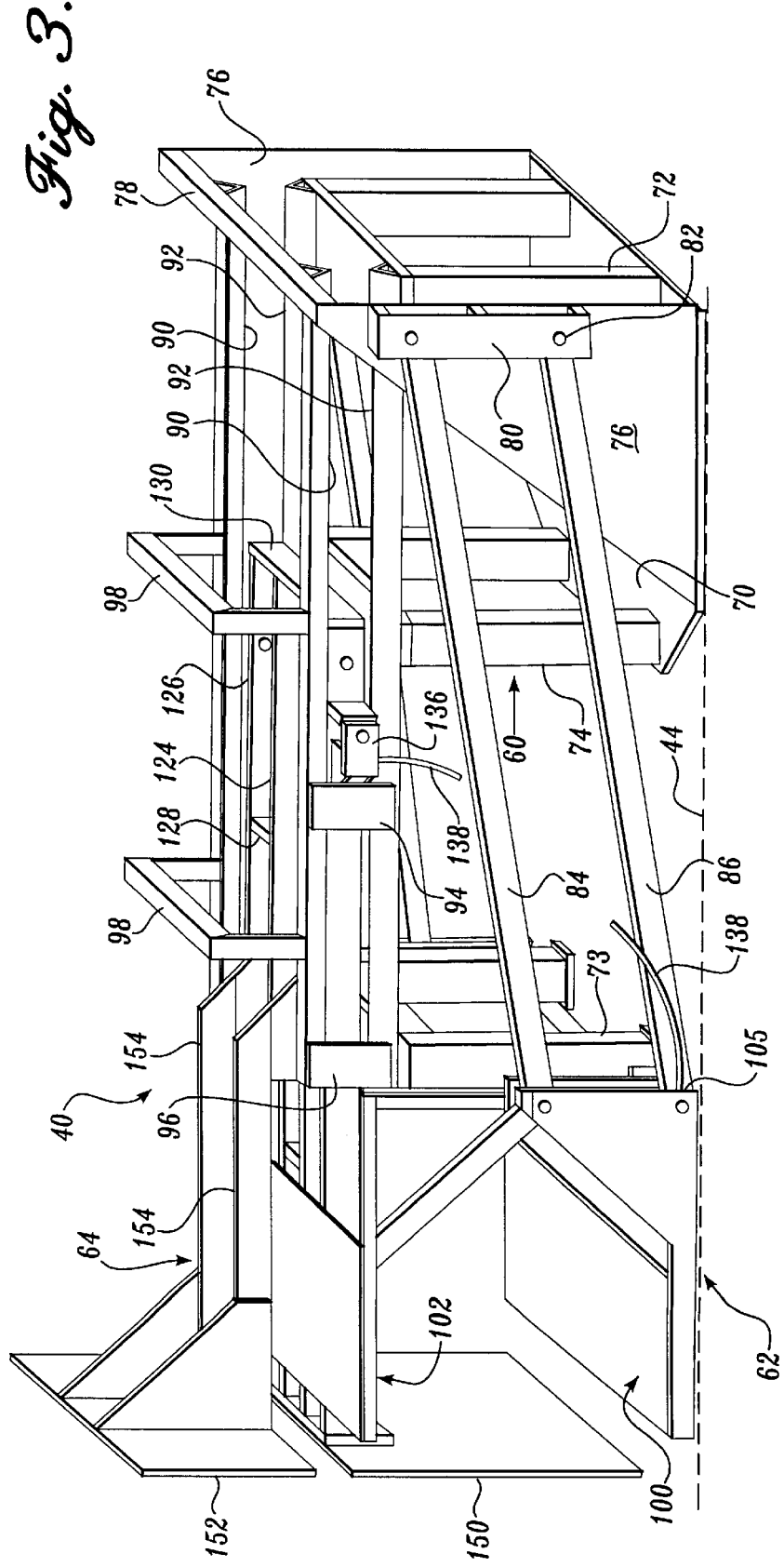

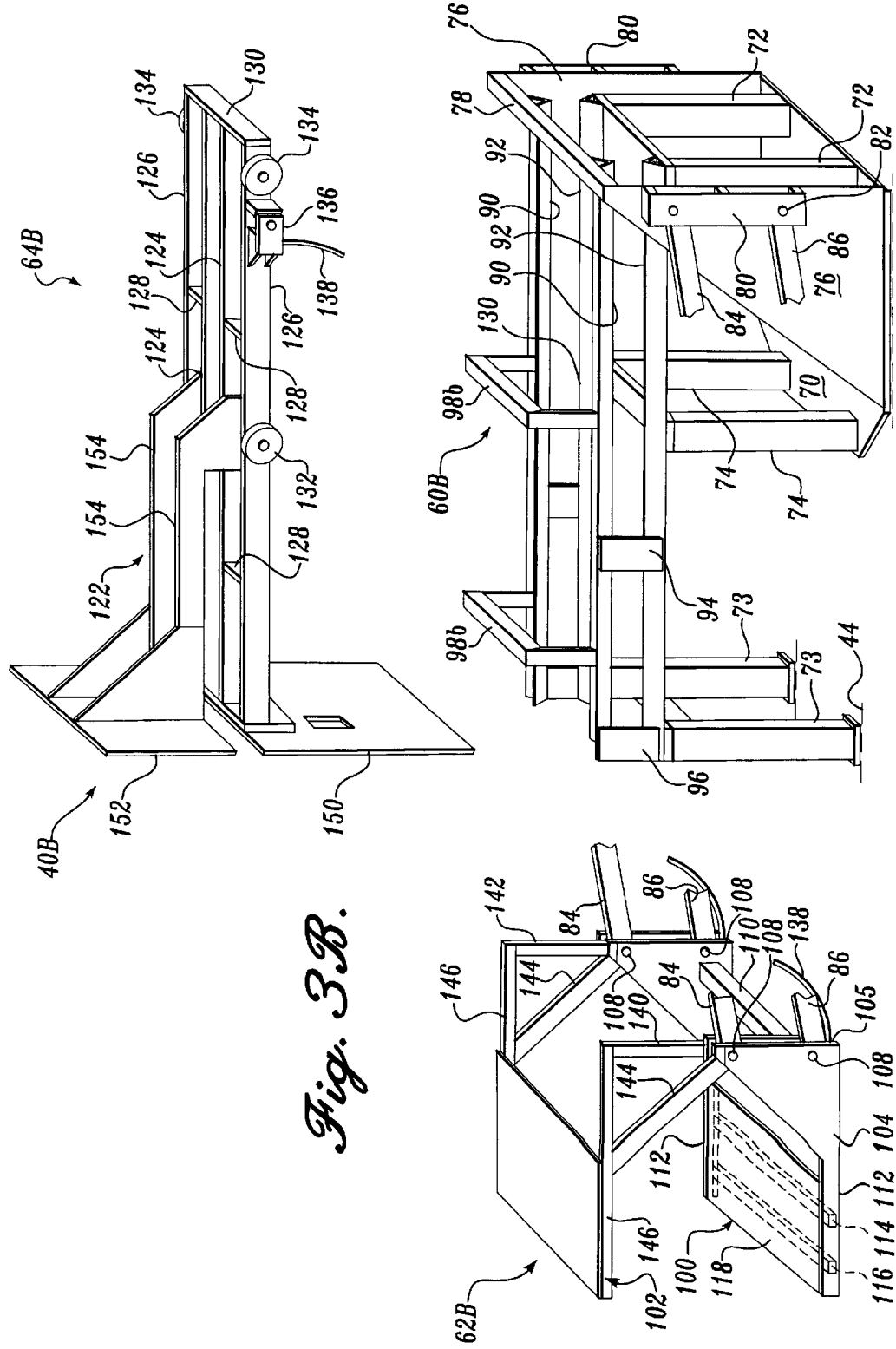

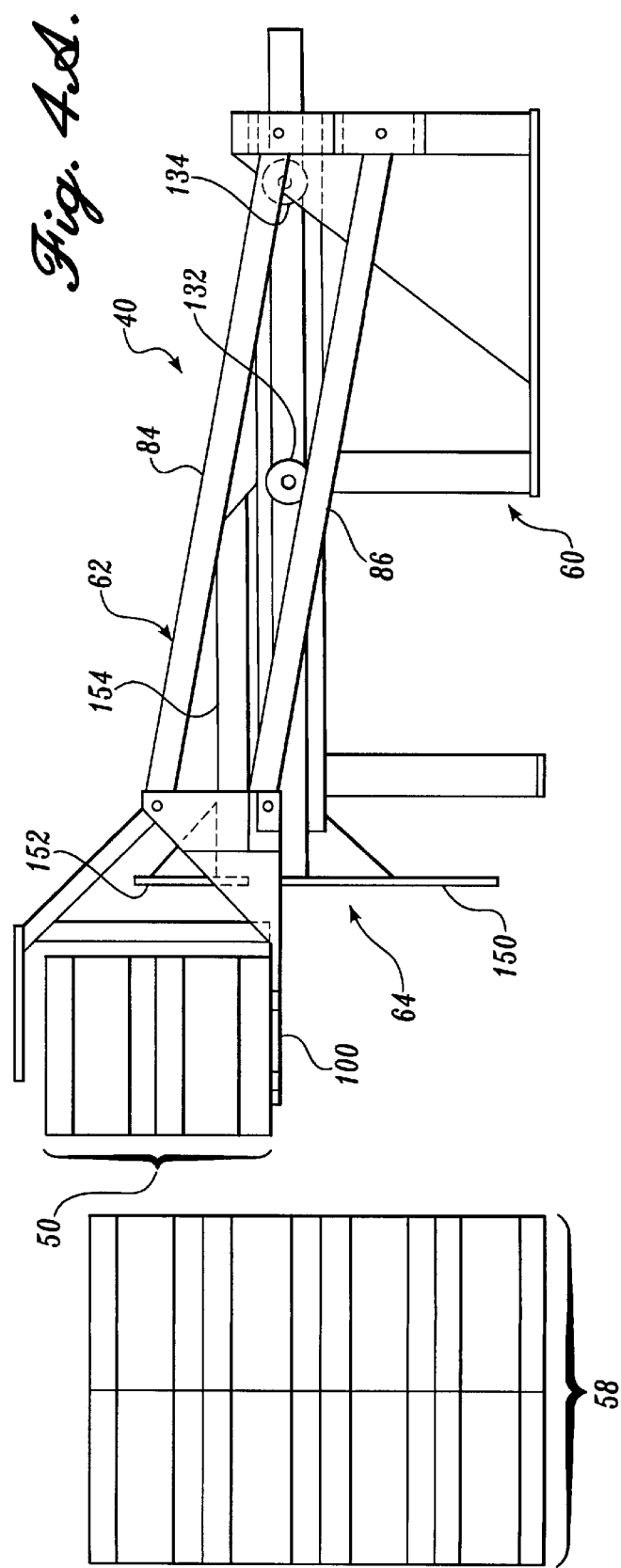

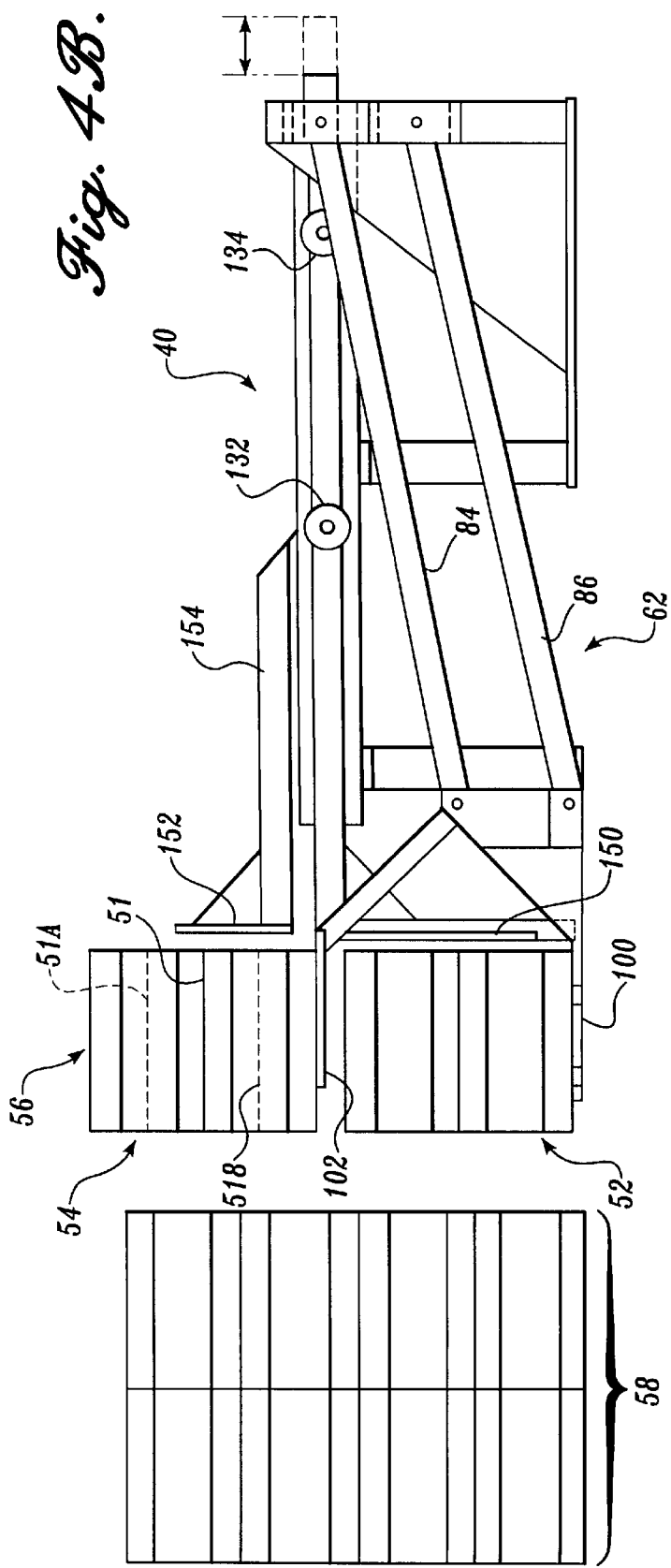

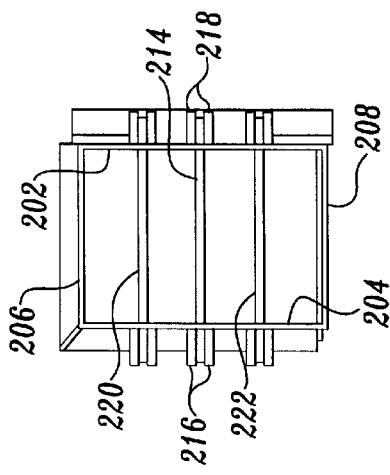
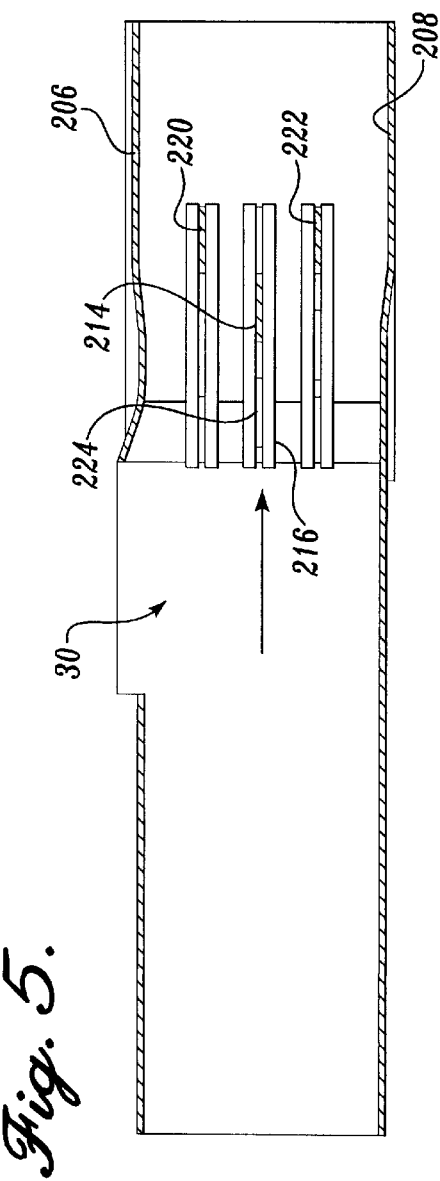
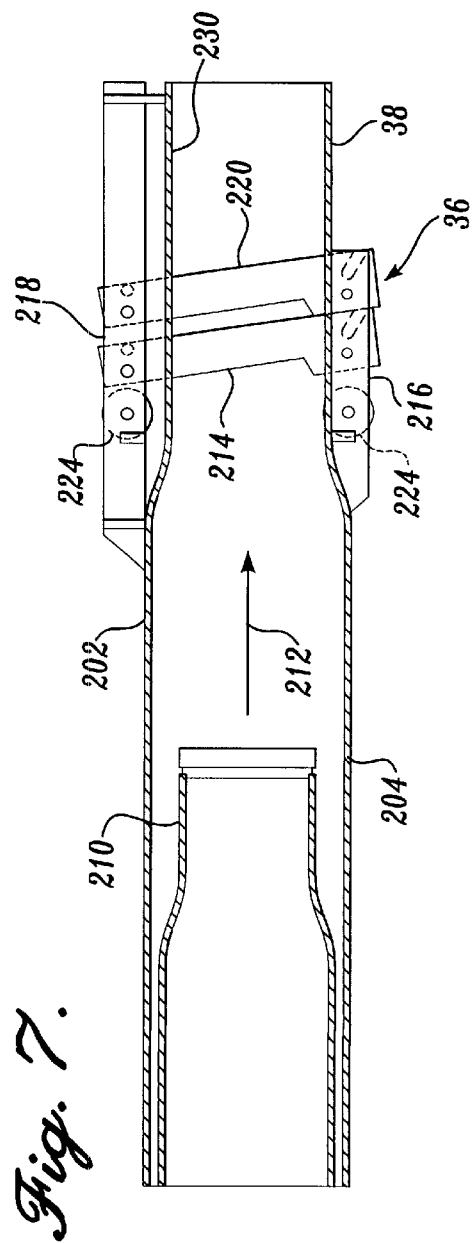

RECOMPACTED HAY BALE CUTTING AND STACKING SYSTEM

CROSS-REFERENCE TO RELATED APPLICATIONS

This application is a continuation of U.S. patent application Ser. No. 08/499,702, filed Jul. 7, 1995 now U.S. Pat. No. 5,887,504.

BACKGROUND OF THE INVENTION

This invention relates generally to apparatus for recompacting, slicing and stacking hay bales into high density compact units.

In the packaging of baled hay for international shipment, it is become commonplace to recompact the hay bales for efficient and economical handling and shipping. As further described, for example, in U.S. Pat. No. 5,001,974, conventional hay bales weighing about 50 kg. (110 pounds) are compressed to about half their field length.

In order to make the recompacted bales easier to handle manually, the recompacted bales can be passed through a cutting means to sever it into two uniform size and weight bales suitable for handling, shipping, and manual handling at the destination. The above-referenced patent describes the use of a double-edged knife blade mounted for vertical reciprocal movement in vertical guides, to cut each recompacted bale along a vertical plane. As an alternative to this method, I have previously built and used what I refer to as a box knife. The box knife has a chamber that is mounted at about a 30° angle from horizontal; a fixed knife blade mounted across the chamber adds the same 30° angle and positioned at about 20° angle from perpendicular to the length of the chamber. A hydraulic ram mounted at one end of the chamber presses each recompacted bale, which is dropped into the chamber in such a way that its straps are oriented parallel to the knife, i.e., at about 30° from horizontal, and pressed through the box knife to slice the bales in half.

An alternative approach to hay recompression is described in my U.S. Pat. No. 5,392,591, which describes enclosing the recompacted bale in an elastomeric net, rather than securing it with straps, and cutting the bale in half at various positions in the recompaction process.

To facilitate shipping, the recompacted bales are assembled into stacks of various sizes, consisting of K-N-M rows, columns and layers of bales. Conventionally, the bales have been stacked manually and thereafter handled by a squeeze truck and then wrapped or strapped into a unit so that the stack can be easily handled either by a squeeze truck or lift truck during loading into and unloading from a shipping container. Manual stacking is very hard work and time consuming but attempts to automate the stacking process have also encountered difficulty. One difficulty is that the half-cut bales do not stack easily, particularly if they have been cut on a vertical plane.

Simpson Equipment Company has previously marketed a box knife-type bale cutter consisting of an elongated chamber with a plunger in one end and a knife blade fixed across the opposite end in the middle of the chamber, the chamber having a hopper for receiving compressed hale bales between the plunger and the fixed knife. This type of bale cutting device was oriented with its sides at about a 45° angle to the horizontal and vertical planes and the knife fixed at about 45° from vertical. The half-cut compressed bales are then conventionally hand stacked and the stacks are preferably unitized for easy handling by a lift truck or squeeze truck, as is known in the art, and then loaded into a shipping container.

Once the shipping container reaches its destination, the stacks of half-cut compressed bales are unloaded and trucked to a feedlot or dairy farm where the half-cut hale bales are removed from the stack and fed to livestock. Handling of the half-cut bales is often done by hand, which is very difficult work even for half-cut bales.

Accordingly, a need remains for ways to improve the efficiency of processing compressed hale bales, cutting and stacking them and handling them when they reach the end user.

SUMMARY OF THE INVENTION

One object of the invention is to further subdivide compressed hale bales so they can be more easily handled manually and at the same time facilitate their stacking.

Another object of the invention is to automate the stacking of compressed hale bales, half-cut bales and quarter-cut bales into tight stacks that can be easily unitized.

One aspect of the invention is an improved box knife-type bale cutter. The bale cutter comprises a chamber having a plunger at one end, a vertically-oriented hopper in a mid-portion of the chamber for receiving a compressed bale having either four straps or a tubular net extending horizontally around the bale, and at least one and preferably three static knives fixed across the bale chamber at an end opposite the plunger, the bale chamber being oriented gravitionally so that its sides are vertical and its upper and lower walls are horizontal, and the knife or knives being oriented horizontally across the chamber for slicing the bale along a horizontal plane. The bale chamber is preferably formed with a first cross-sectional dimension substantially conforming to the cross-sectional rectangular dimensions of the input compressed hay bales and then expands slightly in the vertical dimension at a position longitudinally adjacent the knives. Also, one of the sidewalls of the bale chamber is preferably movably mounted so that it can be repositioned to conform to different horizontal widths of bales. One advantage of this improved box knife-type cutter is that the half-cut or quarter-cut bales remain stacked neatly atop one another. Another is the easy adaptability to handle various sizes of compressed bales.

A second aspect of the invention is a bale stacker adapted for stacking compressed bales, including half-cut bales and quarter-cut bales as they emerge from a bale cutter such as that mentioned above. The stacker comprises a fixed frame, a vertically positionable table assembly and a pushoff assembly. The table assembly comprises a lower platform and, preferably, an upper platform spaced above the lower platform by the vertical dimension of a bale, mounted at opposite ends on a pair of arms pivotally connected to the frame for raising and lowering the platforms while maintaining the platform in a substantially horizontal orientation. The pushoff assembly comprises a lower vertically-oriented plate member connected to a horizontally-extensible ram and positioned to sweep across the lower table, when in a lowered position, to push a tier of bales accumulated on the table's subassembly into a stack. The table assembly is arranged to receive bales in a first direction at one end of the lower platform so that the bales are positioned end to end in a first row when the table assembly is in an elevated position, and then to receive a second row of bales atop the first row of bales when the table assembly is in a lowered position. A table assembly and the pushoff assembly are mutually arranged so that the vertical pushoff plate can pass between opposite ends of the table assembly and the arms supporting the lower platform when the table assembly,is in the lowered position.

As noted above, the table assembly preferably also includes an upper platform spaced above the lower platform by vertical distance sufficient to permit a single row of bales to fit between the upper and lower platforms. In this preferred embodiment, the pushoff subassembly includes upper and lower vertically-oriented pushoff plates, the upper pushoff plate positioned to sweep across the upper platform when the table assembly is in the lowered position. The upper and lower plates are both connected to a common pushoff ram but are spaced vertically apart and supported by framework having a spacing that can be moved noninterferingly above and below the upper platform and between opposite ends thereof.

The table subassembly is preferably connected operatively by a linkage, such as a cable, to the pushoff assembly in such a way that full retraction of the pushoff assembly raises the table subassembly to the upper position and partial advancement or indexing of the pushoff assembly toward the table subassembly lowers the table subassembly. Alternatively, a separate actuator can be used to raise and lower the table subassembly responsive to each row of bales being stacked and the sequenced with operation of the pushoff assembly. The stacker preferably includes means for detecting the completion of rows of bales on the table assembly and control means responsive to said detection to sequence the lowering of the platforms, push off of a tier of bales, retraction of the pushoff assembly and raising of the platforms.

A third aspect of the invention is a system and method for compressing hay bales; half or quarter cutting the bales; and stacking the bales into neat, tight stacks suitable for unitizing without need for manual handling of the bales, preferably employing the foregoing improved box knife bale cutter and stacker, the stacker and bale cutter being mutually positioned so that bales are ejected from the bale chamber onto one end of the lower platform when in the raised position, and onto either a first layer of bales or the upper platform when the table subassembly is in the lowered position.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is a side perspective view of the stacking machine of FIGS. 1 and 2 taken generally along lines 3—3 in FIG. 1.

FIG. 3B is an exploded side perspective view of the double-platform version of the stacker of FIG. 3.

FIGS. 4A, 4B and 4C are side elevation views of the stacker of FIG. 3, showing the operation thereof.

FIG. 5 is a vertical sectional view of the box knife bale cutter taken along lines 5—5 in FIG. 1.

FIG. 6 is a transverse sectional view taken along lines 6—6 in FIG.

FIG. 7 is a sectional view taken along lines 7—7 in FIG. 2.

DETAILED DESCRIPTION

Overall System Arrangement and Operation

Figure 1:
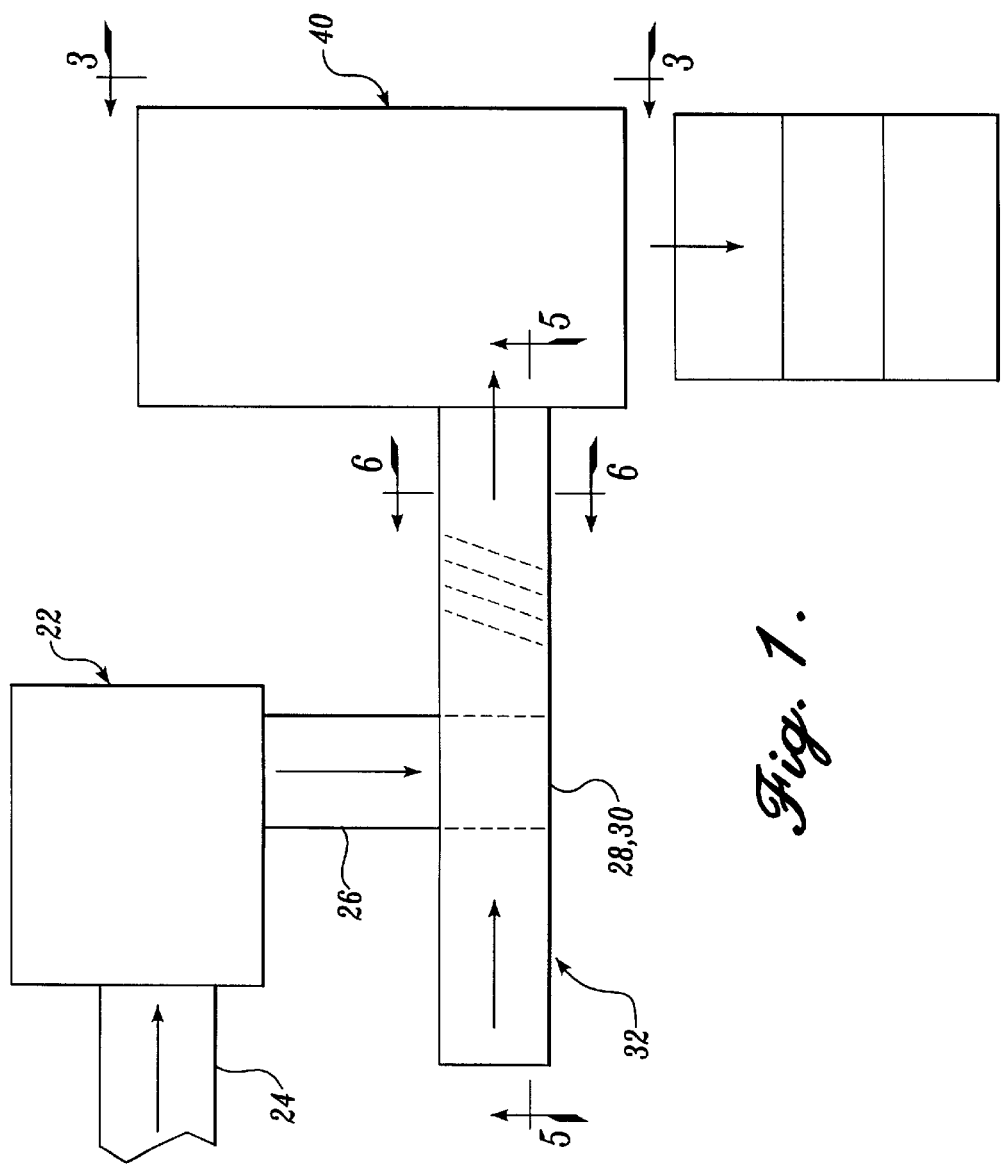
FIG. 1 is a plan view showing in generalized block diagram form, a hay compress, compressed bale cutter and stacking system according to the present invention.
Figure 2:
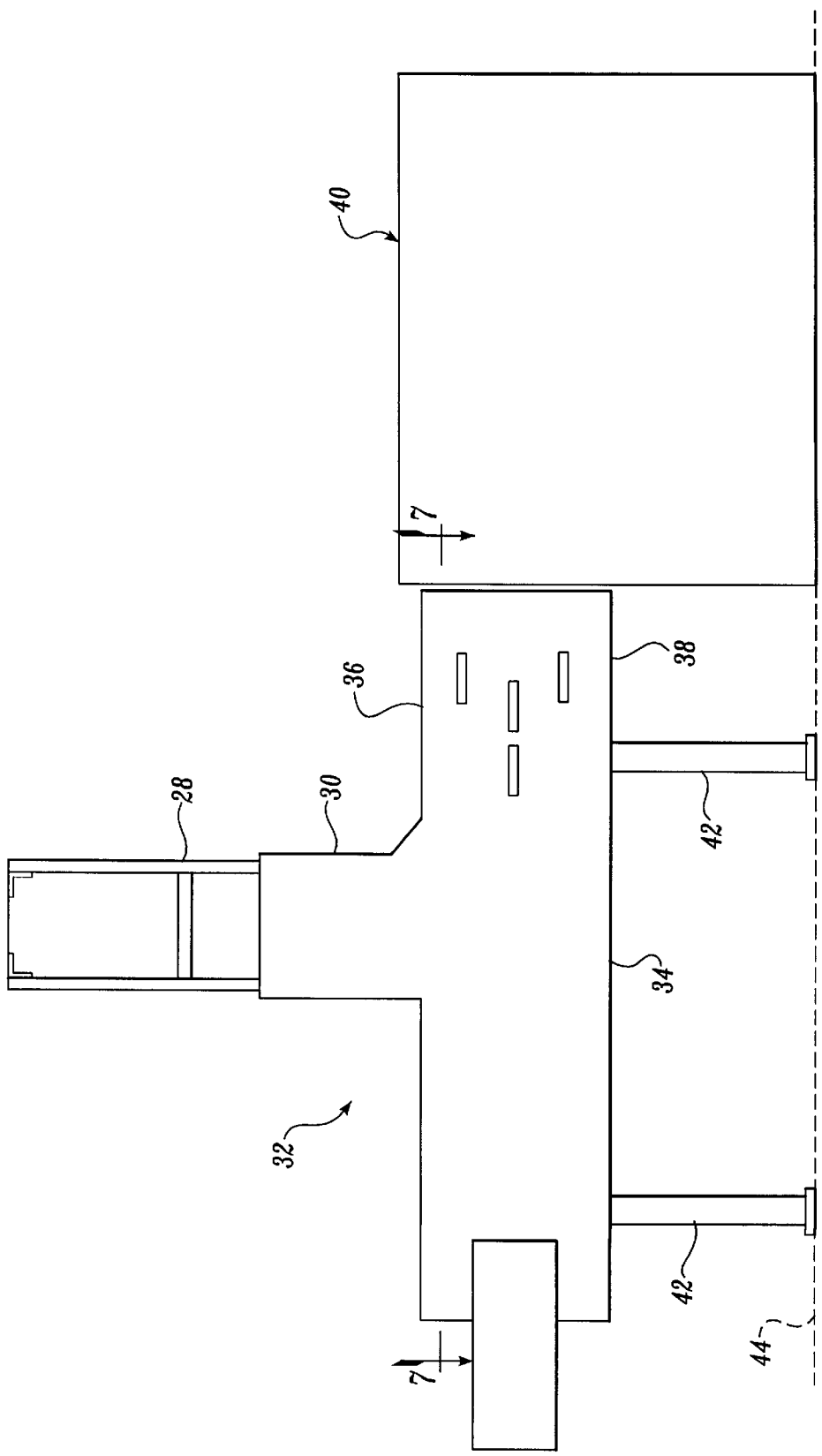
FIG. 2 is a side elevation view of the bale cutter and stacking machine of FIG. 1, the stacking machine shown in end view in block diagram form.

FIGS. 1 and 2 show a system 20 according to the invention in generalized block diagram form. The system includes a hay press 22 receiving field baled hay via input conveyor 24 and then compressing and either strapping, banding or netting the bales to output double compressed bales via conveyor 26. The hay press and conveyors are conventional and so their structure and operation need not be further described. The conveyor 26 is arranged to elevate the compressed bales to a conveyor discharge chute 28 positioned above an input hopper 30 of a box-knife bale cutter 32.

The hopper 30 of box knife 32 is arranged to drop each bale 50 vertically into the midportion of an elongated chamber 34 having a rectangular transverse cross section, and arranged according to the invention as further described below with reference to FIGS. 5, 6 and 7. Each bale is pushed through a knife section 36 of the chamber to cut the bales 50 into half-cut bales along a horizontal cutting line 51 and optionally into quarter-cut bales along dashed cutting lines 51A, 51B as shown in FIG. 4A. Each bale is pushed through to the discharge end 38 of the box knife and ejected into a stacking system or stacker 40, arranged and operated according to the invention as described in detail below with reference to FIGS. 3 and 4. The box knife 32 is mounted on legs 42 or a platform elevated above a horizontal floor surface 44 relative to the stacking system 40 to position the bales ejected from the discharge end 38 at a height greater than the height of a bale.

The stacker 40 includes a table assembly 62 (FIGS. 3, 3A, 3B), described in further detail below, arranged to receive each bale 50 (FIG. 4A) in a first direction at one end of a lower platform so that the bales are positioned end to end in a first row 52, when the table assembly is in an elevated position, and then to receive a second row 54 of bales atop the first row 52 of bales when the table assembly is in a lowered position to form a tier 56 (FIG. 4B) of stacked rows 52, 54 of bales 50. The stacker further includes a pushoff assembly 64 (FIGS. 3, 3A, 3B), further detailed below, which is arranged to sweep across the table assembly to push each completed tier of bales off the table assembly into a stack 58 (FIG. 4C).

Stacker Structure and Operation

Figure 3A:
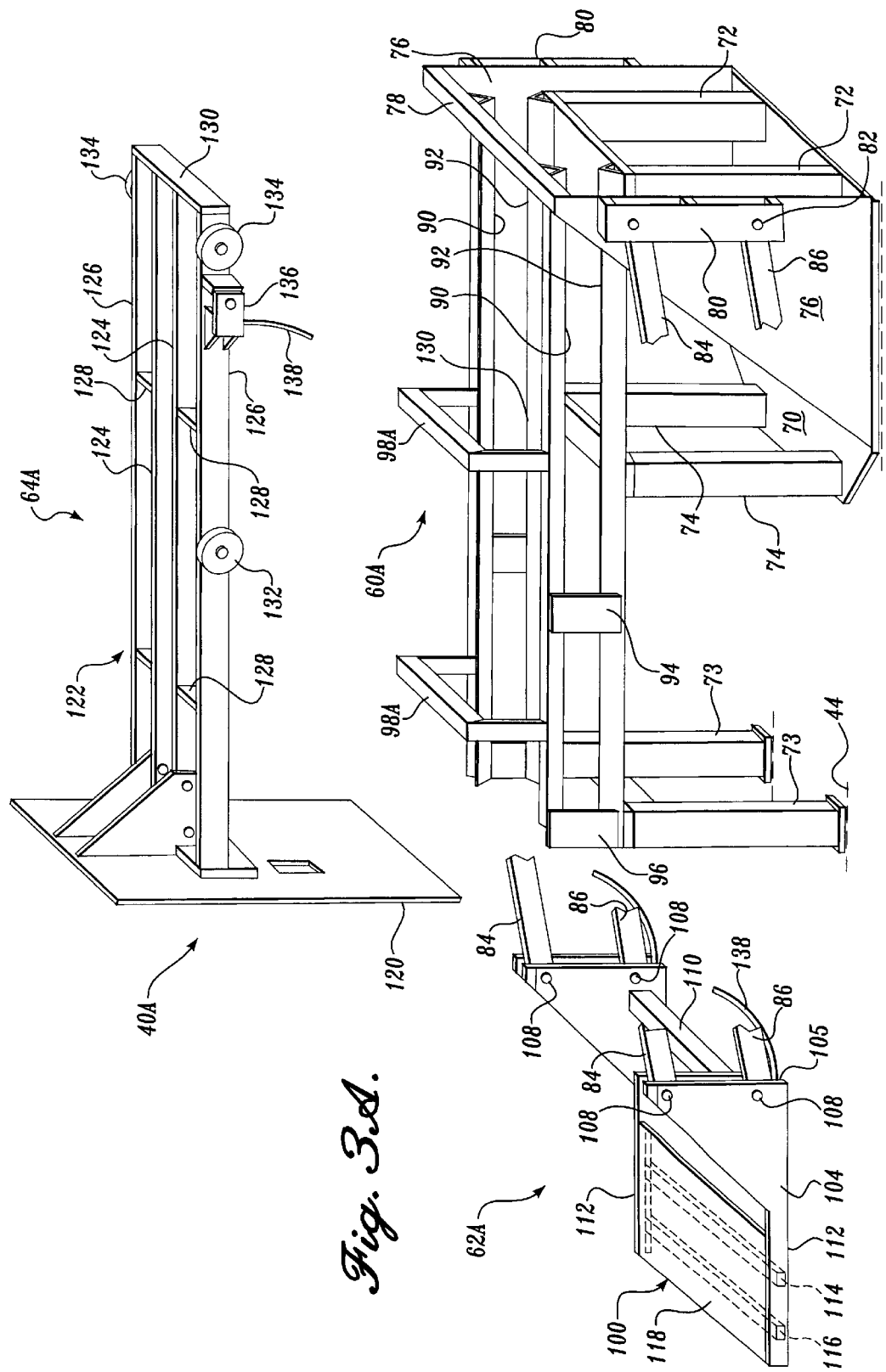
FIG. 3A is an exploded side perspective view of a single-platform version of the stacker of FIG. 3.
Figure 4C:
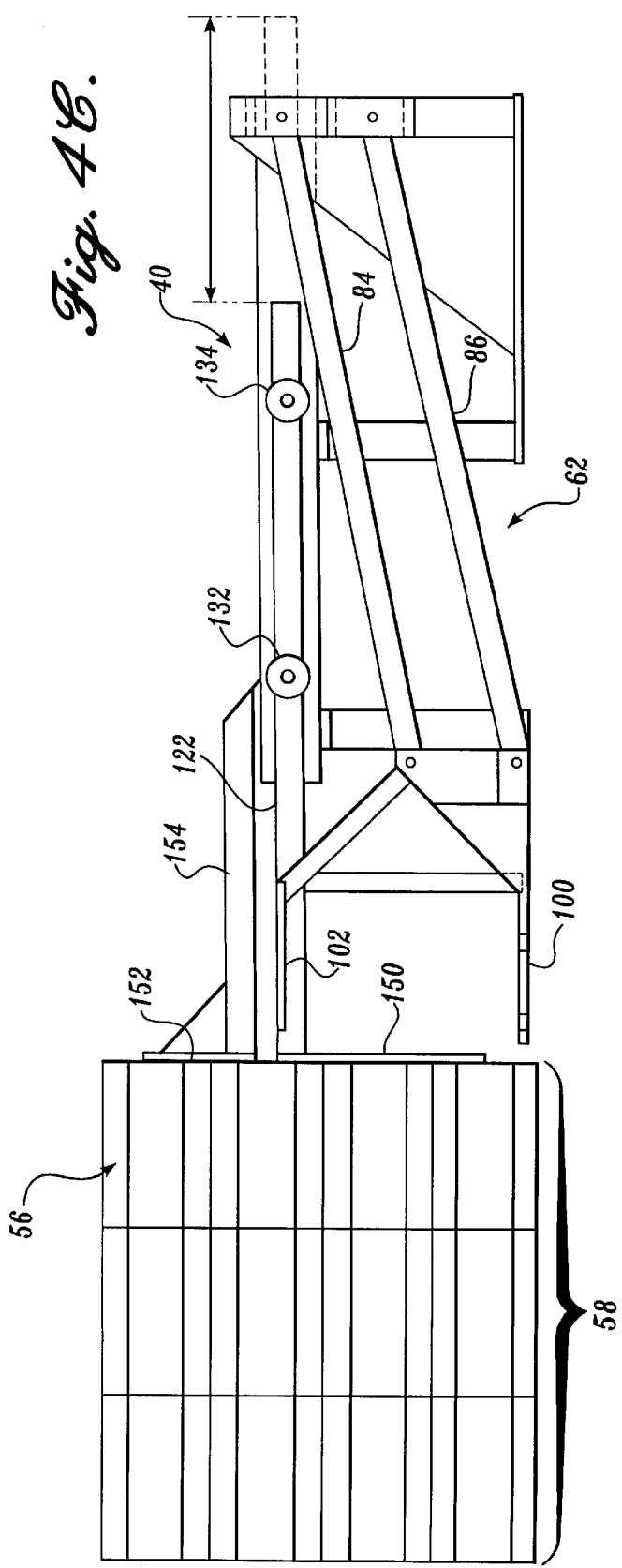

FIG. 3 shows the stacking machine 40 of FIGS. 1 and 2 in a side perspective view from a vantage point on the opposite side of the box knife bale cutter. Two alternative embodiments are shown and described in this section. FIG. 3A shows an exploded view of a single-platform version 40A of the stacker of FIG. 3 from the same vantage point. FIG. 3B shows the structure of the double-platform version 40B of the stacker. Both versions are described together, with like reference numerals identifying like parts and any differences being identified in the respective drawing figures by different reference letter "A" and "B".

Referring to FIGS. 3A and 3B, the stacker comprises a fixed frame 60 supporting the stacker on the floor 44, a vertically positionable table assembly 62B and a pushoff assembly 64B (respectively designated as table assembly 62A and pushoff assembly 64A in the single platform version of FIG. 3A). The frame 60 includes a base plate 70 supporting four upright legs mounted in a rectangular pattern comprising two rearmost legs 72 and intermediate legs 74, and a pair of aligned triangular mounting plates 74 spaced on opposite sides of the base plate outside of legs 72, 74. A front pair of legs 73 is spaced from legs 72, 74 toward the table assembly. Each pair of legs 72, 73, 74 is interconnected across the frame by a cross member 75.

The top ends of the mounting plates 74 are interconnected by a brace 78. Mounted on the outer side of each of plates 76 is a rear arm mounting bracket 80, each spaced from plate 76 and providing a pair of vertically spaced pivot holes for receiving pivot pins 82 for mounting two parallel arms 84, 86 on each side of the frame for connecting the table assembly 62 to the frame.

A pair of tracks for slidably supporting the pushoff assembly are mounted atop legs 72, 73, 74. Each track includes parallel upper and lower angle members 90, 92. The lower members 90 are mounted directly atop cross members 75 over each pair of the legs and extend from rear legs 72 to front legs 73 over legs 74. The upper angle members 92 are spaced above the lower members 90, mounted at the rear of the frame on brace 78 and extending forward above members 90 to legs 73, supported by pairs of vertical side plates 94, 96 and transversely interconnected by inverted U-shaped braces 98B in the two-platform version of FIG. 3B or flat top plates 98A in the single platform version of FIG. 3A.

The table assemblies 62A, 62B each comprise a lower platform 100 and, in the double-platform version, an upper platform 102 spaced above the lower platform 100 by an amount slightly exceeding the vertical dimension of a double compressed bale oriented with its straps extending horizontally around the bale as shown in FIG. 4A. These platforms are pivotally mounted on the ends of parallel pairs of arms 84, 86 opposite the brackets 80, sandwiched between pairs of spaced mounting plates 104, 106 and pivotally connected by pins (not shown) received in pivot holes 108 through plates 104, 106. The table assembly 62A, 62B is thereby connected to the frame for raising and lowering the platforms while maintaining the platform in a substantially horizontal orientation. A cable bracket 105 is mounted on the inside of each of plates 106, for connecting one end of a table lift cable 138 on each side of the table as further described below.

Referring to FIG. 3A, the single platform table assembly 62A has only the lower platform 100, comprising a rear bracing member 110 extending transversely between the mounting plates, a pair of parallel forward extensions 112 of the mounting plates 104, and two forward cross members 114, 116, all supporting a horizontal plate member 118. The lateral spacing of the mounting plates and the corresponding lengths of members 110, 114, 116 and plate 118 define a table length sufficient to support at least two double-compressed bales atop extensions 112, arranged in a row 52 across plate 118. The mounting plates are also spaced laterally apart without interconnections except as described above so the pushoff assembly can pass between them without interference to sweep a tier 56 of bales forward into stack 58 (FIGS. 4B, 4C). In this embodiment, a second row of bales is received directly atop the first, requiring a stop (not shown) to keep the second row of bales from sliding the first row off the platform 100.

Figure 9:
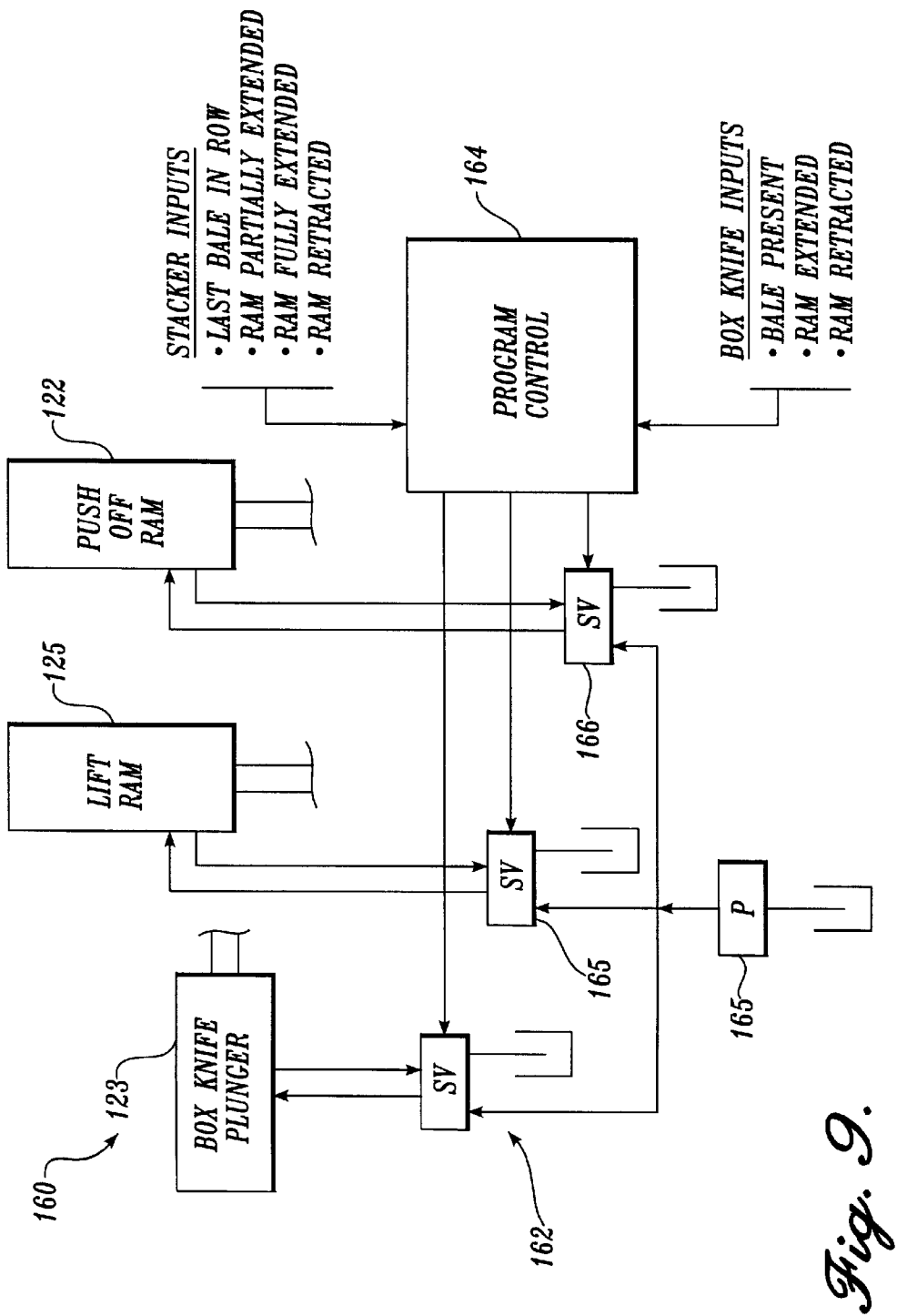
FIG. 9 is a schematic diagram of the actuation subsystem of the stacker of FIGS. 1–4.

The pushoff assembly 64A comprises a vertically-oriented rectangular plate member 120 mounted on a rectangular horizontally-extending frame 122 that is connected to a horizontally-extensible ram 122 (FIG. 9) movably mounted on frame 60A and positioned to sweep across the lower table, when in a lowered position, to push a tier of bales accumulated on the table assembly into a stack 58. The horizontally-extending frame 122 comprises two parallel pairs of parallel members 124, 126, each spaced apart by cross members 128 and rear member 130 in a common plane to carry two front and rear rollers 132, 134. The rollers are positioned to ride on and between the rails defined by angle members 90, 92. Cable brackets 136 are mounted on opposite outer sides of members 126 for receiving rearward ends of cables 138, which have their front ends connected to brackets 105 on both sides of the table assembly as noted above for lifting and lowering the table assembly when the pushoff assembly retracts and is indexed forward. Optionally, this lifting and lowering can be done by a ram 125 (FIG. 9).

Referring to FIG. 3B, the double-platform table assembly 62B uses essentially the same structure of lower platform 100 as that shown in FIG. 3A, but adds an upper platform 102 spaced above the lower table by a distance sufficient to accommodate the height of a bale between them. The upper platform includes two upright members 140, 142 and a diagonal brace 144 on each side, connected to the mounting plates 104, 106, and supporting a pair of forward extensions 146 and cross members (not shown, but like members 114, 116) on which the upper platform 102 is mounted. The upper and lower platforms are thus rigidly interconnected to move up and down as a unit on the forward ends of the two pairs of arms 84, 86.

Referring back to FIG. 3, instead of a single pusher plate 120, the double-platform version uses two vertical plates 150, 152. The lower plate 150 is mounted on a lower pusher frame generally like the frame 122 shown in FIG. 3A. Mounted about midway between the front and rear ends of frame members 124, 126, are a pair of branch members 154 extending parallel to and spaced above the front ends of the frame members to form a fork-like structure. The upper plate 152 is mounted on the front ends of members 154, and thereby spaced above plate 150 a distance sufficient to provide clearance for the two plates to pass above and below upper platform 102.

In operation, the table assembly 62 is arranged to receive bales 50 at one end of the lower platform so that the bales are positioned end to end in a first row, when the table assembly is in an elevated position, as shown in FIG. 4A. Then, once a row 52 of bales 50 is formed on the lower platform, the table assembly is lowered to receive a second row 54 of bales atop the first row of bales, as shown in FIG. 4B.

The table assembly is raised and lowered by tensioning and detensioning the cables 138, which is connected to the pushoff assembly via brackets 136 and their lengths adjusted in such a way that the last increment (e.g., 6") of full retraction of the pushoff assembly raises the table subassembly to the upper position. Partial advancement or indexing of the pushoff assembly forward by the same increment, i.e., toward the table assembly as shown in FIG. 4B, lowers the table subassembly. Alternatively, a separate actuator can be used to raise and lower the table subassembly responsive to each row of bales being stacked and the sequenced with operation of the pushoff assembly.

Figure 10:
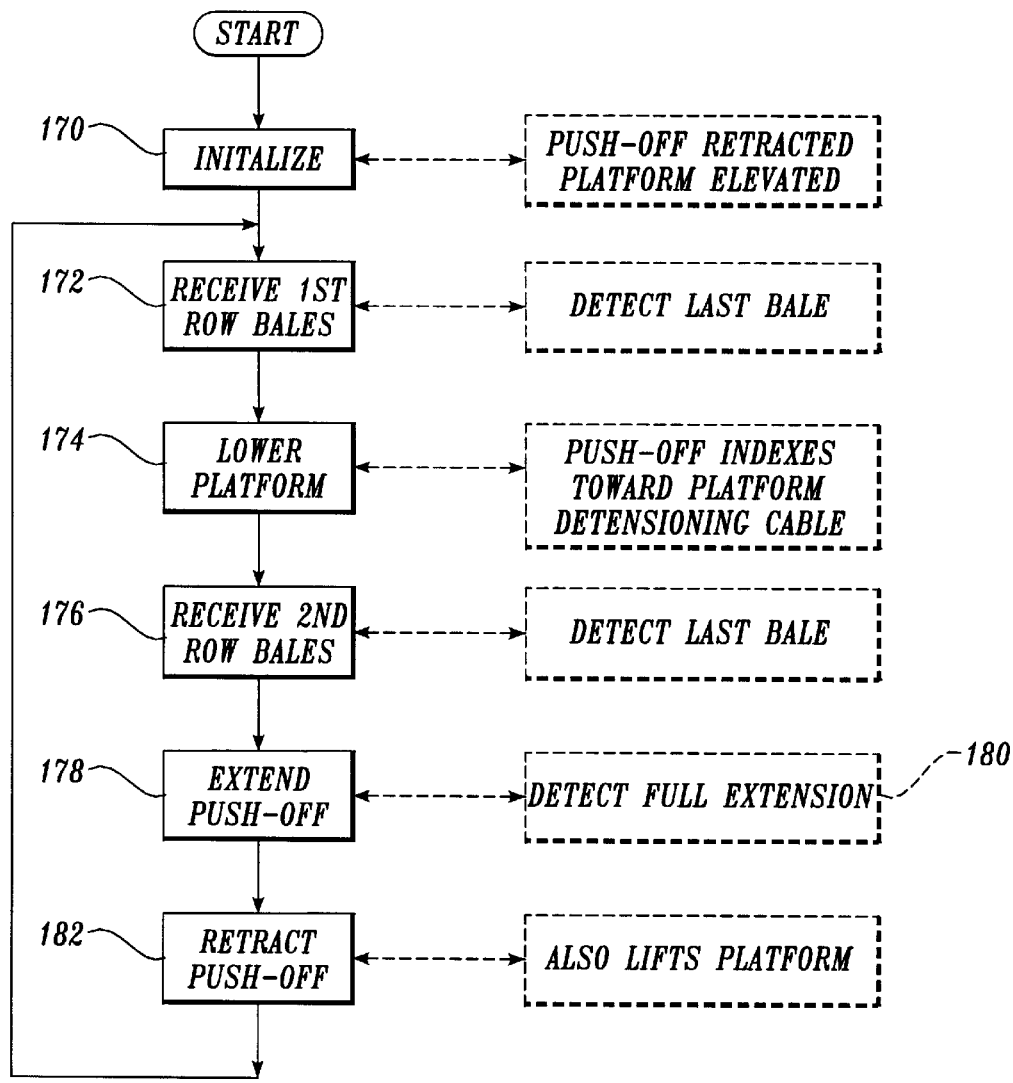
FIG. 10 is a flow chart of the control sequence for the actuation subsystem of FIG. 9 to operate the stacker of FIGS. 1–4.

Referring to FIG. 9, the system has an actuation subsystem 160 comprising a hydraulic circuit 162 operated by an electrical controller 164. The stacker includes pushoff ram 122, as noted above (and if used in conjunction with the box knife 32, also includes a plunger ram 123.) The stacker can also include the optional lift ram 125. Hydraulic power from pump 165 to the pushoff ram is controlled through a solenoid actuated hydraulic valve 166 and to ram 125 through valve 165. Each of the platforms 100, 102 includes a sensor (not shown) for detecting the completion of the rows of bales on the table assembly. The controller includes a control routine (see FIG. 10) responsive to said detection to sequence the lowering of the platforms, either by indexing the pushoff assembly to the position shown in FIG. 4B or by operating a separate ram (not shown). The controller routine is also responsive to inputs from position sensors on the pushoff ram to control push off of a tier of bales (actuate full extension of ram 122) when the tier is complete, retraction of the pushoff assembly when the ram is fully extended, and raising of the platforms (full retraction of the ram 122 or actuation of a separate ram once the pushoff plates 120 or 150, 152 are retracted clear of the table assembly.

FIGS. 4A, 4B and 4C are side elevation views of the stacker of FIG. 3, and FIG. 9 is a flow chart for the program running on controller 164, showing the sequence of operation of the stacker. Operation begins in initialization step 170 (FIG. 10) with the pushoff assembly 64 fully retracted and the table assembly raised, as shown in FIG. 4A, to receive the first bale 50 in a first position on platform 100. This condition is indicated to the controller by a first position sensor that detects full retraction of pushoff assembly 62. When a second bale is received onto the platform 100, it pushes the first bale sideways to a second position on the platform, actuating a detector which inputs a signal to the controller indicating that the last bale of the row has been input (step 172). The controller responds by actuating solenoid valve 166 to index the pushoff ram 122 forward until a second position sensor is triggered at a position that permits the table assembly to be lowered as shown in FIG. 4B (step 174). Then, a further row 54 of bales is received on top of table 102 (or atop the first row of bales 52 in the FIG. 3A version). When the completion of the second row of bales is detected (step 176), the controller responds by again actuating the solenoid valve 166 to fully extend ram 122 (step 178). This action sweeps the pushoff plates across the platforms to push the tier 56 of bales into stack 58, thereby extending the stack. The solenoid valve remains actuated until a limit switch is reached, detecting full extension the ram (step 180). The controller responds by retracting the pushoff ram (step 182), thereby returning the system to the initial conditions to resume receiving bales as shown in FIG. 4A.

Box Knife Bale Cutter

Referring to FIGS. 2 and 9, the plunger ram 132 is shown at the opposite end of the bale chamber from the knife section 36. Referring to FIGS. 2, 5, 6 and 7, the chamber itself is oriented with its sidewalls 202, 204 vertical and its top and bottom walls 206, 208 horizontal. Bales dropped into the chamber through hopper opening 30 are rammed by plunger 210 attached to ram 123 in the direction of arrow 212 through knife section 36, and then ejected through discharge section 38. In the knife section, a center knife 214 is fixed horizontally between brackets sidewalls 202, 204 for half-cutting each bale. The brackets are positioned at different positions on the sidewalls so that center knife is angled relative to the sidewalls, rather than being normal to them, to facilitate cutting. Additional brackets are provided so that second pair of knives 220, 222 can likewise be mounted above and below the center knife whenever it is desired to quarter cut the bales. The knives are positioned vertically so as to pass between the straps of the double-compressed bales. If the bales are secured by elastomeric netting rather than straps, it is preferable to provide a pair of opposed disc-type cutters 224 in the sidewalls in advance of each fixed knife.

The top and bottom walls 206, 208 are contoured to match the vertical dimension of the bales input through hopper 30 before the bales reach the knife section. In the knife section, the top and bottom wall diverge slightly to increase the vertical dimension of the box knife chamber to facilitate passage of the bale above and below the knives.

Figure 8:
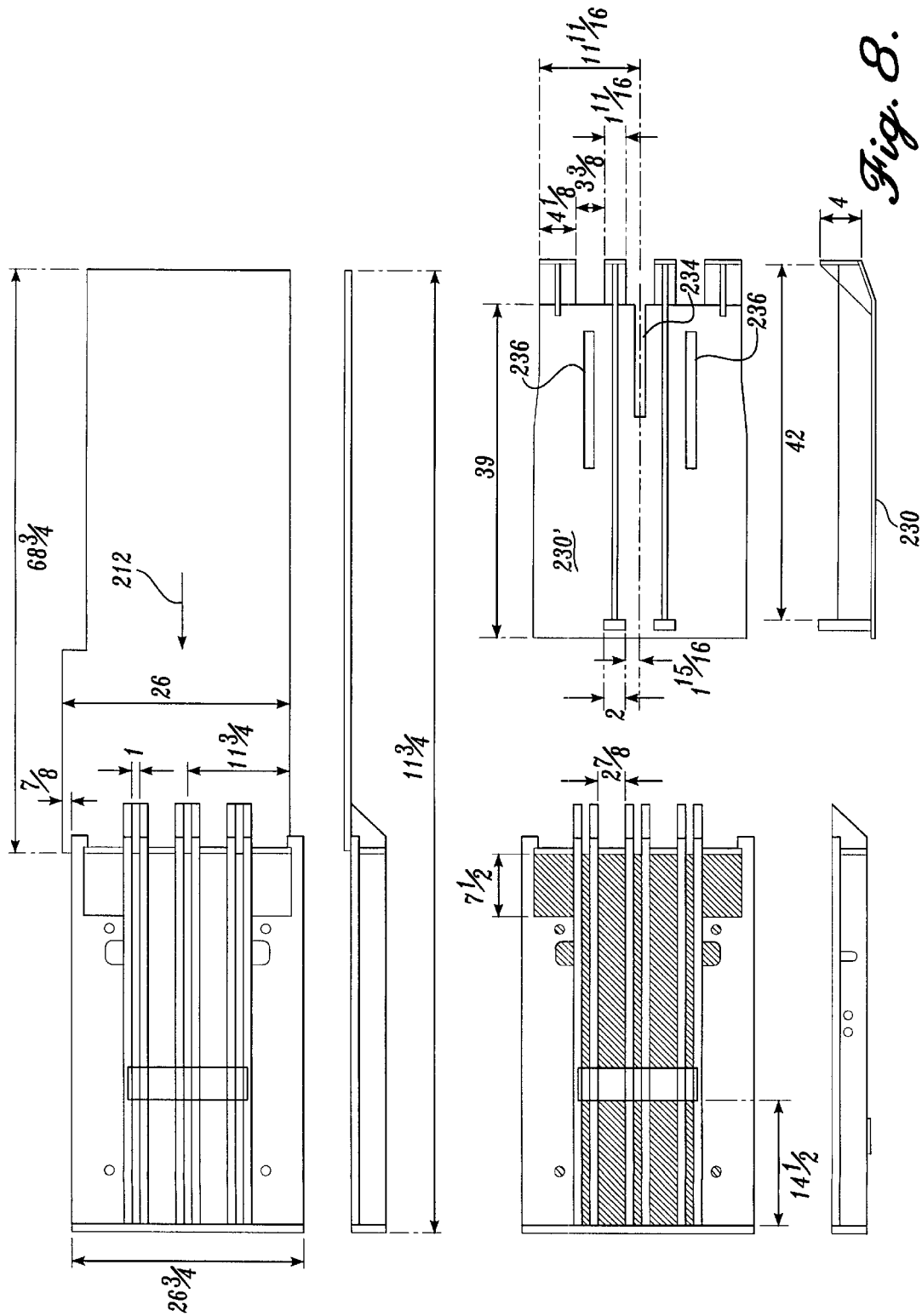
FIG. 8 is a set of orthogonal views showing the individual parts and relationships forming the bale-width adjustment sidewall of FIG. 7.

In addition, the portion 230 of sidewall 202 downstream from hopper 30 is repositionable laterally relative to the top and bottom walls to change the width of the chamber to accommodate bale sizes of different widths. This is done by having a separate, laterally adjustable sidewall assembly 232, as shown in FIGS. 8A and 8B. The sidewall assembly 232 includes a central slot 234 for the center knife 214 and upper and lower slots 236 for the upper and lower knives 220, 222 so that the fixed, angled knives can occupy different lengthwise positions in the wall as it is moved toward or away from the opposite sidewall.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A compressed hay bale cutting and stacking system comprising:

a compressed bale cutter having a vertical infeed hopper, a horizontal chamber, means for moving a bale dropped into the hopper through the chamber, means disposed in the chamber for cutting the bale along a horizontal plane into upper and lower half bales, and means for discharging the upper and lower half-cut bales as a unit with side surfaces of the half-cut bales vertically aligned, the discharging occurring at a first elevation;

a stacker comprising a frame mounted on a horizontal surface, a table assembly, and a pushoff assembly, the stacker being positioned operatively adjacent the bale cutter to receive the half cut bales as a unit from the discharging means;

the table assembly having an elongate first platform movable vertically between a first, raised position aligned with said first elevation for receiving a first row of bales including at least first and second bales arranged end to end lengthwise on the platform and a second, lowered position adjacent the horizontal surface for receiving a second row of bales including at least third and fourth bales arranged end to end above the first row of bales, to accumulate a tier of stacked bales which includes said first and second rows of bales; and the pushoff assembly being mounted on the frame and having a first vertical pushoff plate mounted adjacent one end of the frame, extendable in a horizontal direction across the first platform when the first platform is in the lowered position to sweep the tier of stacked bales off the first platform and retractable to permit the platform to be raised back to the first elevation of the discharging means.

2. A compressed hay bale cutting and stacking system according to claim 1 in which the bale cutter includes means disposed in the chamber for cutting each of the upper and lower half bales along a horizontal plane to form a quarter-cut bale, the bale cutter and stacker being formed and operated in a manner that maintains each portion of the bale in substantial vertical alignment with the other portions of the bale.

3. A compressed hay bale cutting and stacking system according to claim 1 including actuation and control means connected to the bale cutter and stacker for sequencing operation of the bale cutter and stacker to automatically cut and stack bales into the bale cutter.

4. A compressed hay bale cutting and stacking system according to claim 1, wherein the table assembly includes side arms pivotally connected to a distal end of the frame to move the first platform between first and second elevations.

5. A compressed hay bale cutting and stacking system according to claim 1, wherein the pushoff assembly is slidably engaged with the frame to move between extended and retracted positions.

6. A compressed hay bale cutting and stacking system according to claim 1, wherein the table assembly includes a second platform located above the first platform a distance greater than the height of the first row of bales, the second platform for receiving the second row of bales.

7. A compressed hay bale cutting and stacking system according to claim 6, wherein the pushoff assembly includes a second vertical pushoff plate mounted to the frame above the first vertical pushoff plate, the second vertical pushoff plate being extendable in a horizontal direction across the second platform to sweep the tier of stacked bales off the second platform.

* * * * *